(12) United States Patent
Lersch

(10) Patent No.: US 7,905,934 B2
(45) Date of Patent: Mar. 15, 2011

(54) GAS LIQUID SEPARATOR

(76) Inventor: John R. Lersch, Gallipolis, OH (US)

( * ) Notice: Subject to any disclaimer, the term of this patent is extended or adjusted under 35 U.S.C. 154(b) by 218 days.

(21) Appl. No.: 12/365,315

(22) Filed: Feb. 4, 2009

(65) Prior Publication Data

US 2010/0192527 A1 Aug. 5, 2010

(51) Int. Cl.
*B01D 50/00* (2006.01)

(52) U.S. Cl. ............... 55/320; 55/323; 55/324; 55/465; 55/484; 55/486

(58) Field of Classification Search ............ 55/320, 55/323, 324, 462, 465, 484, 486
See application file for complete search history.

(56) References Cited

U.S. PATENT DOCUMENTS

| | | | |
|---|---|---|---|
| 2,201,137 A * | 5/1940 | Hutchison | ............... 96/131 |
| 3,888,644 A | 6/1975 | Holland et al. | |
| 6,576,045 B2 | 6/2003 | Liu et al. | |
| 7,014,685 B2 | 3/2006 | Burns et al. | |
| 2003/0150324 A1 | 8/2003 | West | |

* cited by examiner

*Primary Examiner* — Robert A Hopkins
(74) *Attorney, Agent, or Firm* — Robert R. Waters; Brian W. Foxworthy; Waters Law Group, PLLC

(57) ABSTRACT

A separator comprises a first vessel and a second vessel. The separator includes at least one filter assembly disposed between the first vessel and the second vessel. The separator includes at least one or a plurality of filter assemblies. Each filter assembly provides fluid communication between the first vessel and the second vessel, effectively facilitating movement of the air stream from the first vessel through the assembly(ies) and into the second vessel for further discharge or distribution. In one embodiment, an impact zone is formed within the first vessel for enhancing the removal of particulates from the fluid stream. In another embodiment, at least one deflector is disposed within the first vessel for enhancing the removal of particulates from the fluid stream.

20 Claims, 5 Drawing Sheets

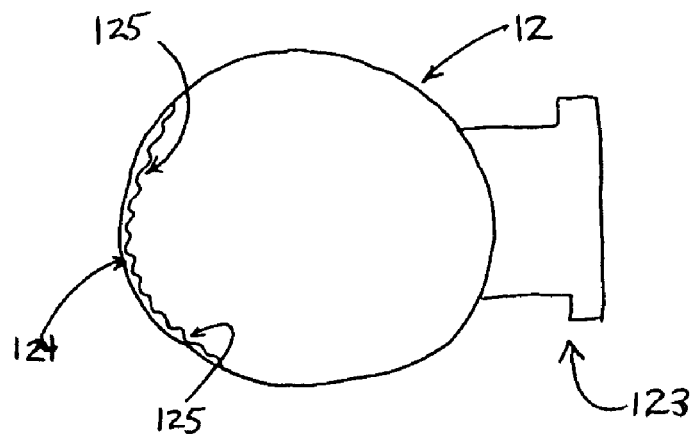
FIG. 11
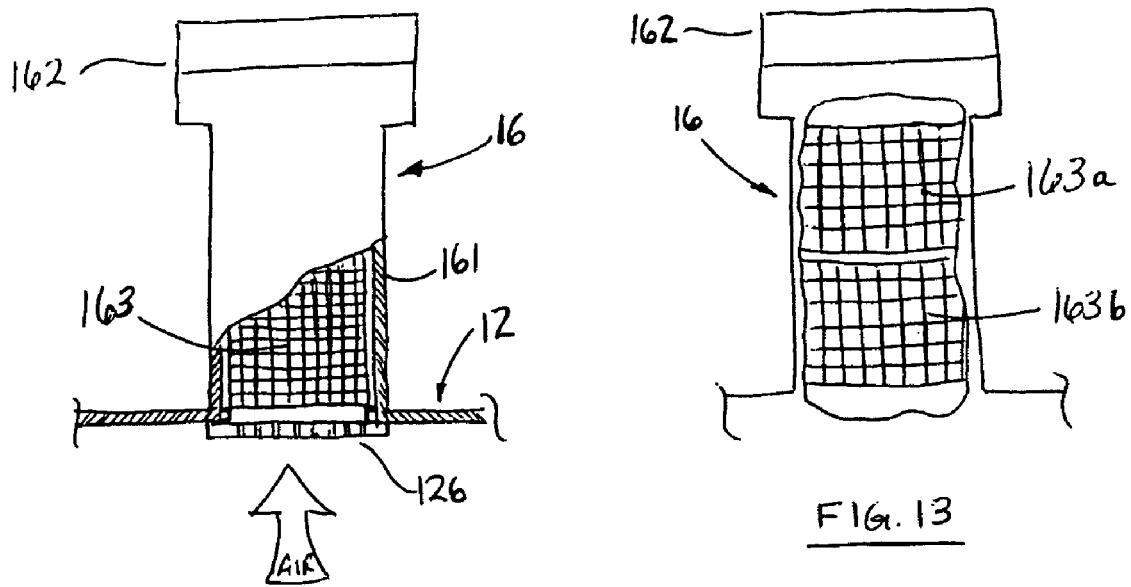
FIG. 12
FIG. 13
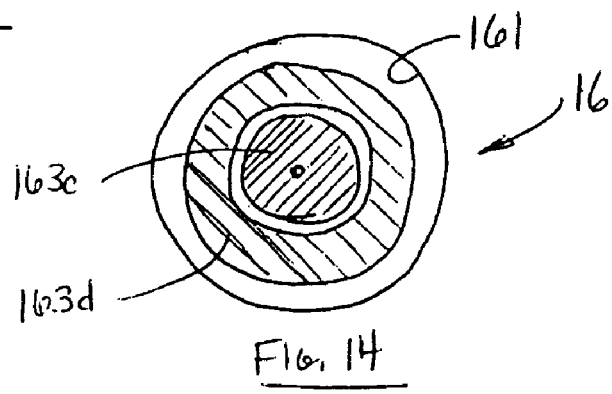
FIG. 14

GAS LIQUID SEPARATOR

BACKGROUND

Certain embodiments of the invention pertain to a separator for filtering fluid streams, including gas and/or liquid streams.

Related technology may include gas filter elements for filtering dry gas streams as well as for separating solids and liquids from contaminated gas streams are well known, as are gas filter elements for coalescing entrained liquids from a gas stream. One non-exhaustive example of related technology is described in U.S. Pat. No. 7,014,685, issued to Burns et al. and assigned to Perry Equipment Corp. of Mineral Wells, Tex. This example, as well as other related technology, discloses multi-stage vessels using individual separator/coalescer filter elements to separate solids, filter liquids, and coalesce liquids.

Certain embodiments of the invention represent improvements pertaining to a separator for filtering fluid streams.

SUMMARY OF THE INVENTION

Certain embodiments of the invention include a feature for improving the quantity of particulates removed from a fluid stream directed through a separating device.

Certain embodiments of the invention include an impact zone communicating with an incoming fluid stream directed through a separating device.

Certain embodiments of the invention include a deflector disposed near an inlet of a separating device, the deflector communicating with an incoming fluid stream directed through the separating device.

The "Summary of the Invention" is provided merely to introduce certain concepts. The "Summary of the Invention" is not intended to identify any key or essential feature of the claimed subject matter.

BRIEF DESCRIPTION OF THE DRAWINGS

FIG. 11 is a side-view cut-away of a vessel having a plurality of recesses formed in or applied to the interior surface of the vessel at an inertial impaction zone;
FIG. 12 is a side-view partial cut-away of a filter having a filter cartridge or medium inserted therein and an optionally installed or applied porous material;
FIG. 13 is a side-view partial cut-away of a filter having at least two filter cartridges or media positioned in a stacked arrangement;
and FIG. 14 is a top view of at least two filter cartridges or media positioned concentric to one another.

DESCRIPTION OF THE EMBODIMENT(S)

Figure 1:
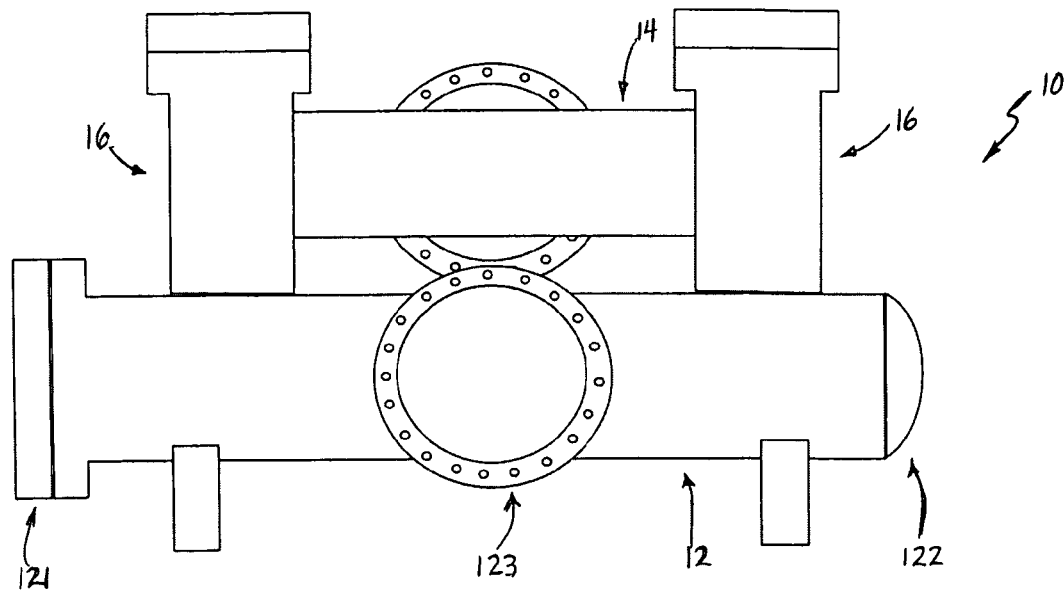
FIG. 1 is front view of one embodiment of a separator.
Figure 2:
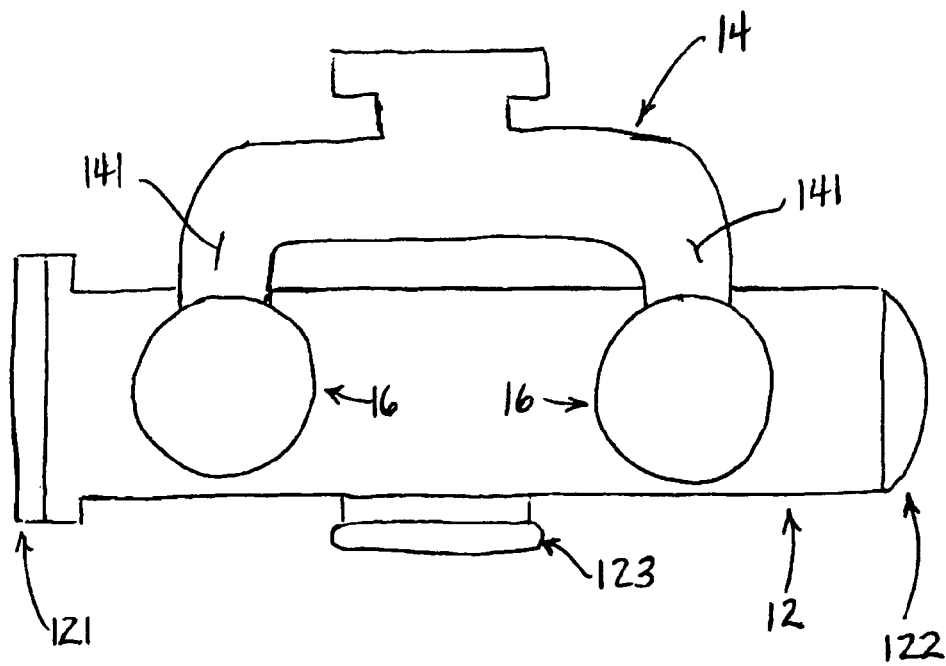
FIG. 2 is top view of FIG. 1.

Referring now to FIG. 1 through FIG. 6, a separator 10 is depicted comprising a first vessel 12 and a second vessel 14. The separator 10 includes at least one filter assembly 16 disposed between the first vessel 12 and the second vessel 14. As depicted, the separator 10 includes a plurality of filter assemblies 16. Each filter assembly 16 provides fluid communication between the first vessel 12 and the second vessel 14, effectively facilitating movement of the air stream from the first vessel 12 through the assembly(ies) 16 and into the second vessel 14 for further discharge or distribution.

The separator 10 may comprise a horizontal or vertical arrangement, or arranged in an orientation between a horizontal and vertical orientation. It is also envisioned that the separator 10 may be arranged so that the first vessel 12 possesses a horizontal (or vertical) orientation and the second vessel 14 possesses a vertical (or horizontal) orientation. It is also envisioned that the separator 10 may have additional alternative orientations. So long as the separator 10 includes a component for receiving ingress of a fluid stream, at least one filter element, and a component for discharging egress of the filtered fluid stream, the configuration may be tailored to accommodate space and/or terrain considerations in the field.

The first vessel 12 may comprise an elongated horizontal or vertical cylindrical vessel that includes opposing ends 121 and 122 that are closed or sealed. One or both of the ends 121 and/or 122 may have a removable cap providing access to the interior of the vessel 12, thereby permitting removal of particulate build-up removed from the fluid stream over time. The first vessel 12 includes a port or inlet 123 for ingress of the fluid stream that is directed into the separator 10 for filtering. The port or inlet 123 may be disposed in a variety of positions. The port or inlet 123 is disposed in a manner to deliver the fluid stream into an inertial impaction zone 124 within the internal volume of the first vessel 12.

Figure 7:
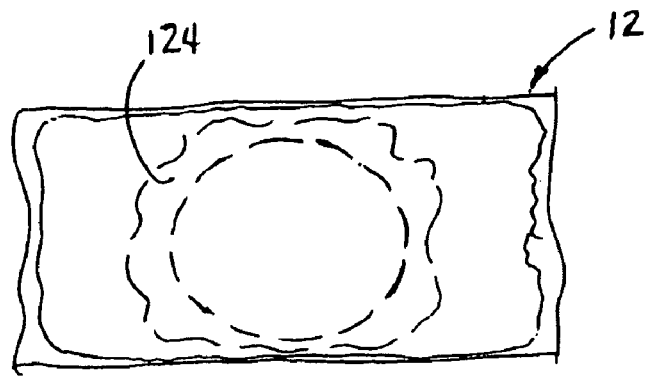
FIG. 7 is a cut-away view of an interior portion of a vessel of a separator consistent with FIG. 1 through FIG. 6 depicting an inertial impaction zone.

The inertial impaction zone 124 may be formed by or in a variety of ways and materials, and may be positioned or located in variable locations. For example, in one embodiment and as depicted in FIG. 7, the inertial impaction zone 124 may be generally identified as the interior surface of the first vessel 12 opposite to the port or inlet 123, with the interior surface having a surface area approximately equal to the cross-sectional area of the port or inlet 123 delivering the fluid stream (e.g. $A=\pi r^2$). In this embodiment, it is envisioned that the fluid stream may strike the inertial impaction zone 124 and the fluid stream may be dispersed toward both ends 121 and 122 of the vessel 12. It is envisioned that the dispersal of the fluid stream toward both ends 121 and 122 reduces the velocity of the fluid stream significantly. The impact of the fluid stream against the inertial impaction zone 124 ejects some of the targeted particulates, with the reduced velocity and splitting of the fluid stream facilitating gravitational precipitation of the targeted particulates.

Figure 8:
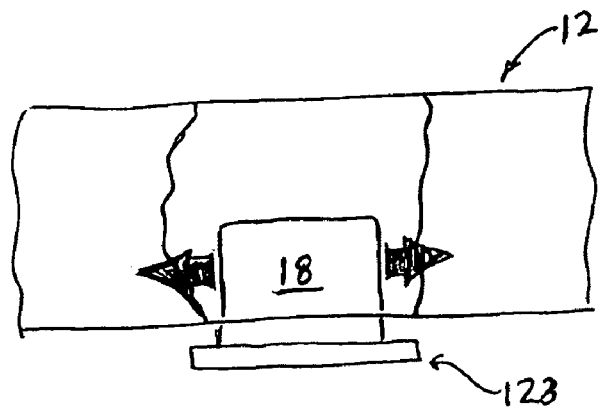
FIG. 8 is a cut-away view of an interior portion of a vessel of a separator consistent with FIG. 1 through FIG. 6 depicting a deflector positioned at or near the inlet or port of a separator.
Figure 10:
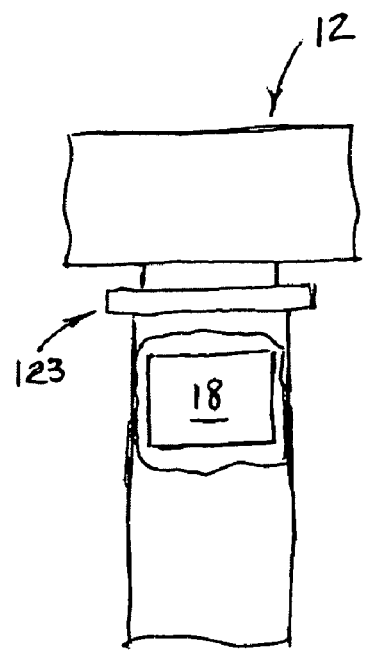
FIG. 10 is a top or plan view of a conduit coupled to an inlet or port of a vessel, the conduit housing a deflector.
Figure 9:
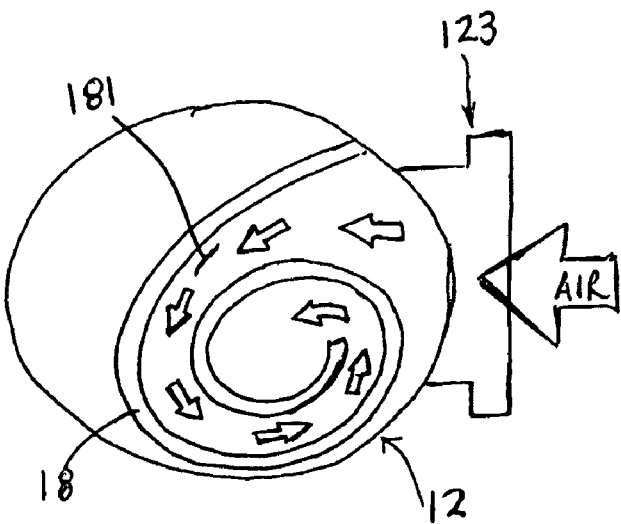
FIG. 9 is a side-view cut-away of a vessel housing a deflector at or near the inlet or port of a separator consistent with FIG. 8.

In another embodiment, an example provided in FIG. 8 and FIG. 9, it is envisioned that one or more deflectors 18 may be utilized with each separator 10, wherein a deflector 18 deflects the fluid stream flow and reduces the velocity by which the fluid stream travels. In one embodiment, the deflector 18 may be placed near or about the impaction zone 124 operating in combination with the impaction zone 124, or, in another embodiment, operating as a substitute to the impaction zone 124. In another embodiment, one or more deflectors 18 may be placed near or about the port or inlet 123, and may be positioned within the vessel 12 or within the conduit (e.g. FIG. 10) supplying the fluid stream to the port or inlet 123 of the vessel 12. Each deflector 18 may comprise a variety of configurations and positions, including the formation of angled channels or ramps, and further including spiral or cyclonic shapes (when viewed from the side of the deflector 18). It is further envisioned that each deflector 18 may include at least one or a plurality of recesses formed in the surface of the deflector to further aid in slowing the velocity of the fluid stream as it enters the first vessel 12. Each deflector 18 may be positioned with the direction of the fluid stream flow, or may be positioned incident to the direction of the fluid flow. Each deflector 18 may be mounted at the desired location, and may be so mounted during manufacture or installation. Mounting of a deflector 18 may be achieved by a variety of means, including mechanical fasteners, welding, adhesive, impingement (fit or frictional), and others similar means.

The inertial impaction zone 124 and/or each deflector 18, separately or in combination, deflects the fluid stream, causing the directional flow of the fluid to change, and thereby reducing the velocity of the fluid stream. Because of the deflection, some of the targeted particulates are ejected through the force of impact against the impaction zone 124. By the change in velocity and/or direction, some of the targeted particulates are removed by gravity, as the weight of some of the particulates is too great in comparison to the velocity of the fluid stream, thereby falling-out by gravity. After deflection, the fluid moves toward and communicates with the assembly(ies) 16 for further extracting targeted particulates.

It is envisioned that the impaction zone 124 may have alternative configurations or additional features, including the use of at least recess, and possible a plurality of recesses 125 (e.g. FIG. 11) formed in the impaction zone 124 surface to further enhance the deflection and deceleration of the fluid stream introduced into the first vessel 12. The recess(es) 125 may be formed during manufacture of the vessel 12, or manually added after manufacture, or during assembly of the separator 10 and system, or added as a separate component, such as a thin layer of substrate with recesses mechanically affixed to the interior surface therein. It is also envisioned that additional components may be added at or near the impaction zone 124 during manufacture, assembly or retrofit to provide options in deflection angles and directional flow of the fluid stream.

It is further envisioned that communication between the first vessel 12 and each filter assembly 16 may be segregated by a porous material 126 (e.g. FIG. 12) for further slowing the velocity of the fluid stream and for further promoting gravitational discharge of heavy particulates from the fluid stream. The material 126 may comprise a removable substrate having a plurality of holes or perforations for egress of the fluid stream from the vessel 12 into the filter assembly 16.

The particulates that are ejected or removed by gravity are envisioned to collect in the base or floor of the first vessel 12. The accumulation of filtered material may be along the long-axis of the vessel 12 (if arranged in a horizontal orientation), or along the short-axis of the vessel 12 (corresponding to one of the closed ends, if arranged in a vertical orientation). The conduit coupled to the port or inlet 123 may be removed to permit standard maintenance of the vessel 12, and especially for removing the filtered material from the long-axis or short-axis of the vessel 12, as an alternative to the cap provided at one of the ends 121 and/or 122. It is also envisioned that if the vessel 12 is vertically oriented, then the cap of the base end of the vessel 12 may be removed and the filtered material may be removed from the cap and the lining or surface of the inner wall of the vessel 12.

Each filter assembly 16 comprises a chamber 161 and at least one filter cartridge or media 163 housed therein, one arrangement of which is represented in FIG. 12. It is envisioned that each chamber 161 may house multiple filter cartridges or media, and may be provided in a stacked arrangement, or in a concentric arrangement. For example, as may be represented in FIG. 13, one embodiment may include a filter cartridge occupying a substantial diameter of the chamber 161 (regardless of chamber 161 geometry, such as cylindrical, orthogonal or some other variation). If the internal volume of the chamber 161 permits, another filter cartridge (of the same or similar structure or function) may be inserted superjacent or subjacent the existing filter cartridge, representing one envisioned embodiment of a stacked arrangement. The stacked cartridges may be designated 163a and 163b for ease of identification. In another example, as may be represented in FIG. 14, another embodiment may include a filter cartridge occupying a fraction of the diameter of the chamber 161. An additional filter cartridge of greater or lesser diameter may be inserted interiorly concentric to the existing filter cartridge or exteriorly concentric to the existing filter cartridge, depending upon which cartridge was initially inserted. In FIG. 14, the cartridges may be designated 163c and 163d, respectively. Thus, cartridge 163d is exteriorly concentric to the cartridge 163c, and cartridge 163c is interiorly concentric to cartridge 163d. In addition, it is envisioned that additional sub-combinations of the cartridge arrangements described above may be utilized if desired.

The chamber 161 is enclosed and having an opened end opposite a closed end communicating with the first vessel 12. It is envisioned that one end of the chamber 161 is enclosed by a removable cap 162. The cap 162 may be threaded, secured by mechanical fastener, gravitational impingement, or secured by other means, including removable adhesive, or various combinations of the aforementioned options. The cap 162 permits maintenance and/or servicing of the cartridge(s) 163 housed by the chamber 161. Each filter cartridge 163 comprises a layer of material for capturing targeted particulates, contaminants or impurities. Each filter cartridge 163 may comprise particle filtration media, chemical absorption or adsorption media, or chemical reaction neutralization media, or a combination of two or more of these alternatives. The chemical media options may be more desirable for applications in which the fluid stream is relatively consistent and discernible, so that the appropriate chemical interaction may occur and yield the desired filtered end-product and facilitating the removal of the desired by-product(s). The geometry or shape of the chamber 161, and thus the filter media utilized, is not limited to a cylindrical or tubular form, and instead may include a variety of geometries to accommodate site conditions or available components.

The second vessel 14 may comprise a generally elongated horizontal or vertical cylindrical vessel having at least one spur 141 through which the vessel 14 communicates with the respective filter assembly(ies) 16. Thus, a spur 141 is intermediately disposed and in fluid communication with a filter assembly 16 and the second vessel 14. The second vessel 14 further includes a port or outlet 142 for egress of the filtered fluid end-product. The port or outlet 142 may be coupled to a conduit or collection device for delivery of the filtered product for further use.

Figure 3:
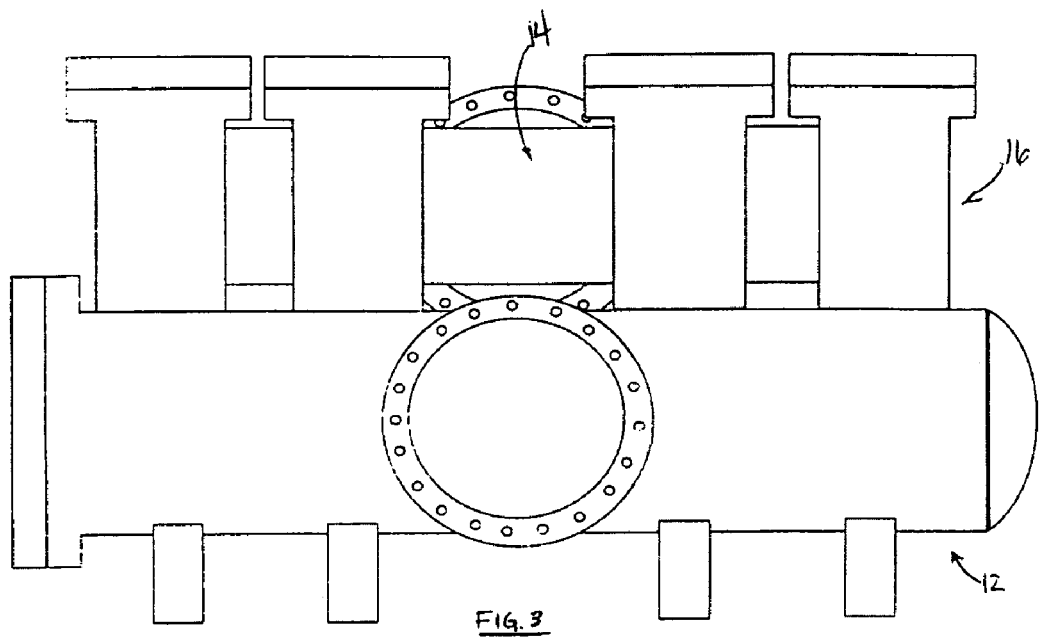
FIG. 3 is front view of another embodiment of a separator.
Figure 4:
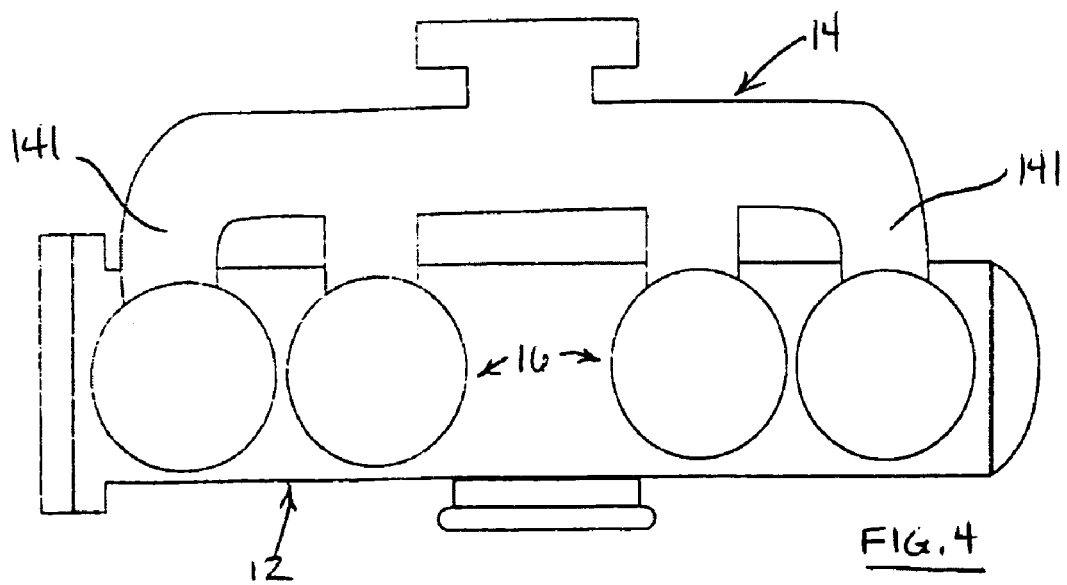
FIG. 4 is a top view of FIG. 3.
Figure 5:
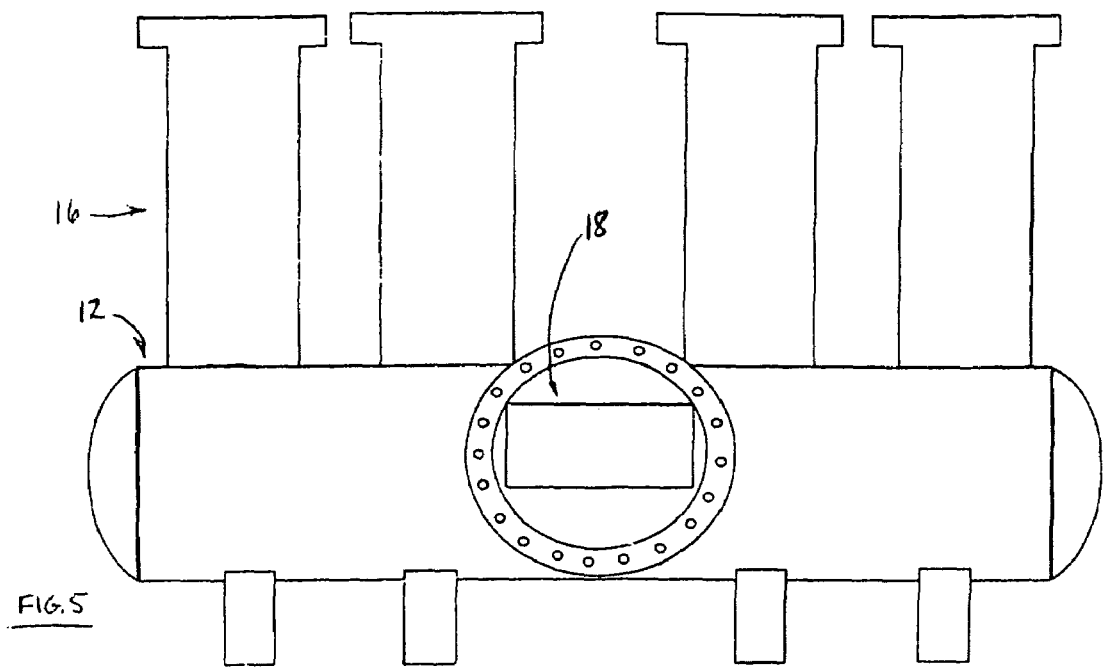
FIG. 5 is front view of another embodiment of a separator.

In one embodiment of the separator 10, two (2) filter assemblies 16 are intermediately disposed between the vessels 12 and 14, respectively (FIG. 1). In another embodiment of the separator 10, four (4) filter assemblies 16 are intermediately disposed between the vessels 12 and 14, respectively (FIG. 3). Neither the number of filter assemblies 16, nor the general configuration, nor the spatial configuration, is/are limited to those depicted in the figures. For example, it is envisioned two (2) filter assemblies 16 may each be in direct communication with the first vessel 12, with a conduit from each filter assembly 16 mutually coupled to form a single spur 141 communicating with the second vessel 14. This configuration may have the advantage of removing any residual particulates unfiltered through the other stages. Similarly, in a four (4) filter configuration, each element may have conduit mutually coupled in a way to reduce the number of spurs required to connect with the second vessel 14.

In one embodiment of the separator 10, as depicted in FIG. 1 and FIG. 12, respectively, the separator 10 comprises a first vessel 12 and a second vessel 14, with a plurality of filters 16 disposed intermediately between the vessels 12 and 14. The first vessel 12 comprises an elongated cylindrical vessel with a horizontal orientation. The port or inlet 123 is positioned approximately in the center of the elongated cylindrical vessel. The filter assembly(ies) 16 is/are generally disposed in a vertically oriented direction relative to the first vessel 12. The filter assemblies 16 are arranged so that the direction of an imaginary axis drawn through each filter is orthogonal to the direction of an imaginary axis drawn through the vessel 12.

In a two (2) filter configuration, it is envisioned that each filter assembly 16 is positioned on opposite sides of the port or inlet 123, in an attempt to evenly distribute the fluid stream through the vessel 12. In a four (4) filter configuration, it is envisioned that two (2) of the filters 16 are positioned on opposite sides of the port or inlet 123 in relation to the other two (2) filters so that the port or inlet 123 essentially divides the filters into even quantities on either side of the port or inlet 123. As noted above, it is envisioned that a plurality of filters may be used, and is not limited to even-numbered filters. Therefore, in an odd-number element configuration (e.g. three (3) filters), one (1) filter is positioned on one side of the port or inlet 123 and the other two (2) filters are positioned on the opposite side of the port or inlet 123. In addition, it is envisioned that one or more of the filters 16 may be positioned at angle that are not vertically oriented relative to the vessel 12. Stated differently, one or more of the filter assembly(ies) 16 may be arranged at an angle more than or less than vertical relative to the alignment of the vessel 12.

In the aforementioned embodiment(s), the second vessel 14 may have the general appearance of a manifold, wherein each spur or arm 141 interconnects at least one of the filter assembly(ies) 16, and specifically chamber 161. The port or outlet 142 provides a means of egress for the filtered fluid from the internal volume of the second vessel 14 or manifold.

Figure 6:
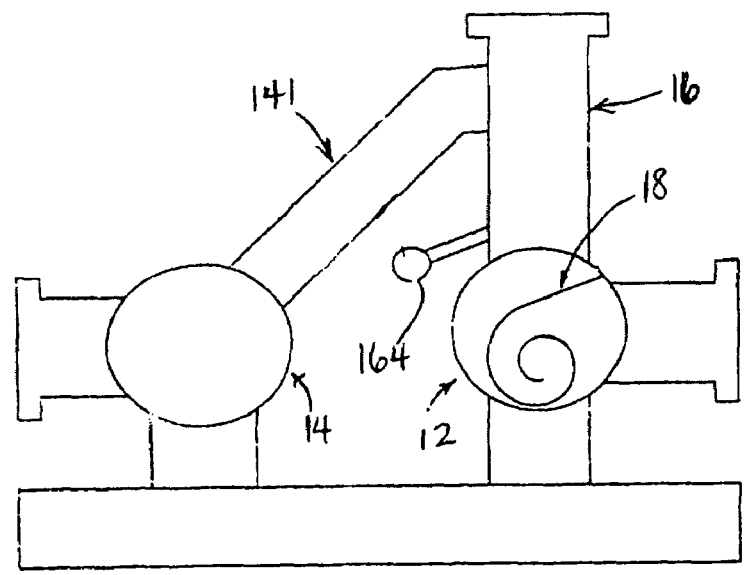
FIG. 6 is side view of FIG. 5.

In another embodiment, such as that depicted in FIG. 6, the separator 10 comprises a first vessel 12, a second vessel 14, and a plurality of filter assembly(ies) 16. The first vessel 12 comprises an elongated cylindrical body enclosed at opposing ends and having an inlet 123 intermediately disposed between the ends. The first vessel 12 has an internal volume. A deflector 18 may be disposed within the first vessel 12 at the face of the inlet 123. As but one example, the deflector 18 may be formed in the shape of a roll defining a space or channel 181 (e.g. FIG. 9) therein permitting the fluid stream to travel therethrough. The deflector 18 reduces the velocity of the fluid stream, as well as dispersing the fluid stream out from both open sides of the deflector 18. Dispersal from both sides of the deflector 18 distributes the fluid stream for continued movement at reduced velocity of the fluid stream into the filter assembly(ies) 16. As noted, reduction of the velocity permits the heavier particulates in the fluid stream to fall-out because of the influence of gravity.

The second vessel 14 has an elongated cylindrical body and has an outlet 142, the second vessel having an internal volume receiving the fluid stream. A plurality of filters 16 may be disposed between the first vessel 12 and the second vessel 14, each one of the filter assemblies comprising a chamber 161 and at least one filter cartridge or medium 163. It is envisioned that at least one secondary drain 164 may be included as part of the separator 10 to encourage drainage of contaminants and other materials away from the filter assembly(ies) 16, thereby increasing the effective life of the filter media 163 and reducing maintenance and/or repair.

It is envisioned that the first vessel 12 is positioned adjacent a surface, including a ground surface or a constructed platform. In such a configuration, the first vessel 12 is positioned in a manner to provide ease of access to the inlet 123. Typically, the scale and size of the vessels and the caps or closures used to seal the vessel or to couple the vessel with conduit requires material of considerable strength and weight. This results in maintenance activities that are dangerous because of the risk of injury and trauma. This also reduces costs by eliminating the need to build large platforms that must meet strict OSHA requirements for use. By lowering the height level, the risk of injury or trauma is reduced, though not necessarily eliminated. As a result of the lower level of the vessel 12, the filter assembly(ies) 16 are also lowered, and thus, a simple platform may be included in the assembly for access to the top of the filter(ies) 16 and the cap(s) 162 that may be used to seal each filter assembly 16.

In use, a "dirty" fluid stream is introduced into the first vessel 12 via the port or inlet 123 and directed to the impaction zone 124. The fluid strikes the impaction zone 124, ejecting some of the contaminants from the fluid. Thereafter, the directional flow of the fluid is altered, and the velocity of the fluid decreased permitting heavy contaminants to fall from the fluid through the influence of gravity. The ejected or extracted contaminants generally collected on the interior "floor" of the first vessel 12.

The fluid then travels upward through one or more of the filter assembly(ies) 16 provided opposite to the floor of the first vessel 12. As the fluid travels through the filter assembly(ies) 16, additional contaminants are removed from the fluid stream via particle filtration, chemical absorption or adsorption, or chemical neutralization (or a combination thereof) to further purify the fluid for a specified end-use.

The filtered fluid stream moves from the chamber 161 through the spur or arm 141 and into the internal volume of the second vessel 14. The spur or arm 141 may be angled or positioned (e.g. FIG. 4), and may take advantage of inertial impaction, directing the fluid stream against an internal surface of the second vessel 14, thereby providing an additional opportunity to remove undesirable particulates from the fluid stream consistent with this technique. Thereafter, the fluid is directed through the port or outlet 142 for transport to another destination or for delivery into a storage chamber or compartment.

It is envisioned that multiple separators 10 as described above may be combined in a series to form a separator complex or system that is capable of handling a greater volume of fluid and/or a greater degree of "dirty" or contaminated fluid. It is also envisioned that the multiple separators 10 may be of one specific arrangement or configuration, or may be a combination of the various embodiment configurations described above.

The relative size of the separator 10, and the constituent components, is scalable to accommodate the project, which may be dependent upon volume load, terrain, economics and other factors. It is envisioned that the vessels 12 and 14, and the inlet 123 and outlet 142 may be provided in various diameters, though it is expected that 20" diameter may be a standard size for manufacture and operation, consistent with many of the separator units commercially available and utilized at present.

The use and application of the separator 10 described above is suitable for use in filtering natural gas (methane) for delivery to end-users, among other specific uses contemplated. By way of example only, the use of a separator 10 in filtering natural gas removes a significant amount of solid particles and liquids from the natural gas stream. Purification of natural gas is a highly desirable service, since removing impurities from natural gas improves the performance and life-span of devices such as engines, turbines, compressors, valves and meters, generally. In filtering natural gas by use of this separator 10 apparatus, the value of decreasing service frequency and reducing the severity of the damage imparted by impurities in the natural gas during use, a business or operation realizes a non-trivial cost savings.

It is to be understood that the embodiments and claims are not limited in application to the details of construction and arrangement of the components set forth in the description and illustrated in the drawings. Rather, the description and the drawings provide examples of the embodiments envisioned, but the claims are not limited to any particular embodiment or a preferred embodiment disclosed and/or identified in the specification. The drawing figures are for illustrative purposes only, and merely provide practical examples of the invention disclosed herein. Therefore, the drawing figures should not be viewed as restricting the scope of the claims to what is depicted.

The embodiments and claims disclosed herein are further capable of other embodiments and of being practiced and carried out in various ways, including various combinations and sub-combinations of the features described above but that may not have been explicitly disclosed in specific combinations and sub-combinations. Accordingly, those skilled in the art will appreciate that the conception upon which the embodiments and claims are based may be readily utilized as a basis for the design of other structures, methods, and systems. In addition, it is to be understood that the phraseology and terminology employed herein are for the purposes of description and should not be regarded as limiting the claims.

Furthermore, the Abstract is neither intended to define the claims of the application, nor is it intended to be limiting to the scope of the claims in any way. It is intended that the application is defined by the claimed appended hereto.

What is claimed is:

1. A separator device comprising:
    a first vessel in fluid communication with a second vessel;
    at least one filter assembly intermediately disposed between the first vessel and the second vessel;
    the first vessel comprising an inlet in fluid communication with an impact zone formed within the first vessel;
    the second vessel comprising an outlet;
    each of the at least one filter assembly comprising a chamber having a removable cap, and
    at least one filter medium housed within the chamber.
2. The device of claim 1, wherein the first vessel comprises an elongated body terminating at opposing closed ends.
3. The device of claim 2, wherein one of the closed ends comprises a removable cap.
4. The device of claim 1, wherein the second vessel comprises an elongated body.
5. The device of claim 1 further comprises at least one arm disposed between the at least one filter assembly and the second vessel.
6. The device of claim 1, wherein the impact zone is formed on an interior surface of the first vessel.
7. The device of claim 1, wherein the impact zone further comprises at least one recess.
8. The device of claim 7, wherein the at least one recess is formed on an interior surface of the first vessel.
9. The device of claim 7, wherein the at least one recess is formed on a thin layer of substrate applied to an interior surface of the first vessel.
10. The device of claim 1 further comprising a porous material disposed between the first vessel and the at least one filter assembly.
11. A separator device comprising:
    a first vessel in fluid communication with a second vessel;
    at least one filter assembly intermediately disposed between the first vessel and the second vessel;
    at least one deflector disposed within the first vessel;
    the first vessel comprising an inlet in fluid communication with the deflector;
    the second vessel comprising an outlet;
    each of the at least one filter assembly comprising a chamber having a removable cap, and
    at least one filter medium housed within the chamber.
12. The device of claim 11, wherein the first vessel comprises an elongated body terminating at opposing closed ends.
13. The device of claim 12, wherein one of the closed ends comprises a removable cap.
14. The device of claim 11, wherein the second vessel comprises an elongated body.
15. The device of claim 11 further comprises at least one arm disposed between the at least one filter assembly and the second vessel.
16. The device of claim 11, wherein the at least one deflector is disposed near the inlet.
17. The device of claim 11, wherein the at least one deflector further comprises at least one recess.
18. The device of claim 17, wherein the at least one recess is formed on an interior surface of the at least one deflector.
19. The device of claim 17, wherein the at least one recess is formed on a thin layer of substrate applied to an interior surface of the at least one deflector.
20. The device of claim 11 further comprising a porous material disposed between the first vessel and the at least one filter assembly.

* * * * *